United States Patent [19]
Hey

[11] Patent Number: 4,996,642
[45] Date of Patent: * Feb. 26, 1991

[54] SYSTEM AND METHOD FOR RECOMMENDING ITEMS
[75] Inventor: John B. Hey, Concord, Mass.
[73] Assignee: Neonics, Inc., Concord, Mass.
[*] Notice: The portion of the term of this patent subsequent to Sep. 26, 2006 has been disclaimed.
[21] Appl. No.: 411,857
[22] Filed: Sep. 25, 1989

Related U.S. Application Data
[63] Continuation-in-part of Ser. No. 103,848, Oct. 1, 1987, Pat. No. 4,870,579.
[51] Int. Cl.$^5$ .................. G09B 19/00; A63F 9/18
[52] U.S. Cl. .................. 364/419; 434/236; 273/161
[58] Field of Search .......... 364/401, 419, 410, 554, 364/550; 434/237, 236; 358/86, 84; 455/2; 273/161

[56] References Cited
U.S. PATENT DOCUMENTS
4,870,579 9/1989 Hey ............................. 364/419
4,872,113 10/1989 Dinerstein ..................... 364/401

Primary Examiner—P. S. Lall
Assistant Examiner—S. A. Melnick
Attorney, Agent, or Firm—Wolf, Greenfield & Sacks

[57] ABSTRACT

A system and method of selectively recommending, for a user selected from a group of users, items such as movies sampled by one or more of the users in the group but not sampled by the selected user. The recommendations are based on other items previously sampled by the user and preferably on the availability of the items from a source, for example the availability of movies from a video store. A scalar rating is defined for each item sampled by the selected user to represent the reaction of the selected user to that item. The selected user is successively paired with the users in a group for whom have been defined scalar ratings for at least some of the items sampled by the selected user to determine the difference in ratings for items sampled by both members of that pair. An agreement scalar is generated for each pair representing the overall rating agreement between the members of each successive pair. A plurality of the other users are designated as recommending users and the agreement scalar is converted into a weighting value for each of the recommending users. The weighting values are applied to items not yet sampled by the selected user to adjust the recommendation for the selected user to more closely anticipate the actual reaction of the user to that item. Preferably, at least one item is selected to be presented to the selected user based on a predetermined criterion and on the availability of the item from the source.

28 Claims, 5 Drawing Sheets

{ }
SYSTEM AND METHOD FOR RECOMMENDING ITEMS

RELATED APPLICATIONS

This application is a continuation-in part from U.S. Ser. No. 103,848, filed Oct. 1, 1987, now U.S. Pat. No. 4,870,579 which is incorporated herein by reference.

FIELD OF THE INVENTION

This invention relates to a system and method of recommending items not yet sampled by a user, and more particularly to such a system and method which adjust a scalar rating for each unsampled item, such as a movie, for that user based on the similarity in reaction of other users relative to that user.

BACKGROUND OF INVENTION

There are a number of situations in which it is helpful to predict the reactions of people to items they have not yet had the opportunity to sample. It is particularly useful to make recommendations for items to which people have wholly subjective reactions and which require a substantial investment of time or money to review, such as movies, books, music, and games. Difficulty arises because the actual reaction of a person to such an item can only be determined after money and time are invested in sampling the item.

The desirability of making recommendations for subjectively appreciated items is evidenced by the prevalence of movie critics, book reviewers, and other critics who attempt to appraise such items. However, the uniqueness of each item hinders objective comparison of the items relative to the response they will elicit from each individual. Short synopses or reviews are of limited value because the actual satisfaction of an individual depends upon his reaction to the entire rendition of the item. For example, books or movies with very similar plots can differ widely in style, pace, mood, and countless other characteristics. Moreover, knowledge beforehand of the plot or content can lessen enjoyment of the item.

It is common to study the advice of professional critics, but it is difficult at best to find a critic whose taste matches the taste of a particular individual. Using a combination of critics provides more information, but correctly combining and interpreting multiple opinions to extract useful advice is quite difficult. Even if a satisfactory combination is achieved, the opinions of professional critics frequently change over time as the critics lose their enthusiasm or become overly sophisticated.

Public opinion polls attempt to discern the average or majority opinion on particular topics, particularly for current events, but by their nature the polls are not tailored to the subjective opinions of any one person. Polls draw from a large amount of data but are not capable of responding to the subjective nature of a particular individual.

All of the above techniques require research by an individual, and the research is time consuming and often applied to out of date material. An individual is provided little help in making an optimal choice from a large set of largely unknown items.

Additionally, the site at which the individual is making his selection may not have a complete inventory of all possible items. Many video stores, for example, carry several thousand different movies, but by no means do they carry a complete selection of all movies. Moreover, no matter how complete the selection is initially, a number of movies are checked out or otherwise unavailable at any given time. It is desirable to recommend only those movies which are currently available at that video store. Many video stores utilize an inventory management system to keep track of which movies have been checked out. However, these systems do not generate recommendations based on the available inventory.

SUMMARY OF INVENTION

It is therefore an object of this invention to provide a system and method which automatically and accurately recommend to a person items which have not yet been sampled by that person.

It is a further object of this invention to provide such a system and method which draw upon the experience of a group of people and selectively weigh the subjective reactions of the group to make accurate recommendations for any person within the group.

It is a further object of this invention to provide such a system and method which can repeatedly update the recommendations for each person as the experience of the group increases.

A still further object of this invention is to provide such a system and method which can recommend movies to an individual.

Yet another object of this invention is to provide such a system and method which can communicate with an inventory management system to determine which movies are available before recommending those movies to the individual.

It is a further object of this invention to provide such a system and method which can identify items already sampled and prevent accidental repetition of sampled items.

A still further object of this invention is to provide such a system and method which reguire little time or effort on the part of each person in a group to obtain accurate recommendations.

Another object of this invention is to provide such a system and method which readily assimilate a new person or item and rapidly accomplishes accurate recommendations for each.

This invention results from the realization that truly effective prediction of subjective reactions, of one or more persons selected from a group of persons, to unsampled items such as movies, books or music, can be achieved by defining a scalar rating to represent the reaction of the selected person to each sampled item, successively pairing each selected person with other persons in the group to determine the difference in ratings for items sampled by both members of the pair, designating one or more of the other persons as predicting persons, assigning a weighting value to each of the predicting persons, and applying the weighting values to update the ratings previously predicted for each item unsampled by the selected person.

This invention features a method of selectively recommending, for a user selected from a group of users, items sampled by one or more users in a group but not sampled by the selected user. The recommendations are based on other items previously sampled by the user and on the availability of the items from a source. A scalar rating representing the reaction of a selected user to that item is defined, and the selected user is successively paired with other users in the group for whom have been defined scalar ratings for at least some of the items sampled by the selected user. The difference in ratings for items sampled by both members for that pair is determined, and an agreement scalar representing the overall rating agreement between the members of each successive pair is generated. A plurality of the other users are designated as recommending users and the agreement scalar is converted for each of the recommending users into a weighting value. The weighting values are applied to items not yet sampled by the selected user to proportionally alter the difference between a rating previously established for each item not yet sampled by the selected user and ratings of that item by the recommending users. The recommendations for the selected user are thereby adjusted to more closely anticipate the actual reaction of the user to that item. One or more items to be presented are then selected based on one or more predetermined criteria and on the availability of the item from the source.

Preferably, the predetermined criteria include selection of the most highly recommended item, or a number of the most highly recommended items, for the selected user. In one embodiment, the predetermined criteria may be specified by the user prior to the recommendation process. The selecting of the items may include determining the availability of the item by interrogating a system such as an inventory management system which maintains an inventory of items available from the source, such as the availability of movies at a video store. Alternatively, an inventory status of the items is maintained, and the step of selecting includes determining the availability of the item by comparing the item to the inventory status of that item.

Also, a rating may be provided for a specified item selected by a user. For example, a customer may wish to learn what type of recommendation has been made for him for certain movies not yet seen by him. Those selected movies would then be presented to the customer with the rating predicted for that customer.

This invention further features a system for providing such recommendations.

DISCLOSURE OF PREFERRED EMBODIMENT

Other object, features and advantages will occur from the following description of the preferred embodiment and the accompanying drawings, in which.

Figure 1:
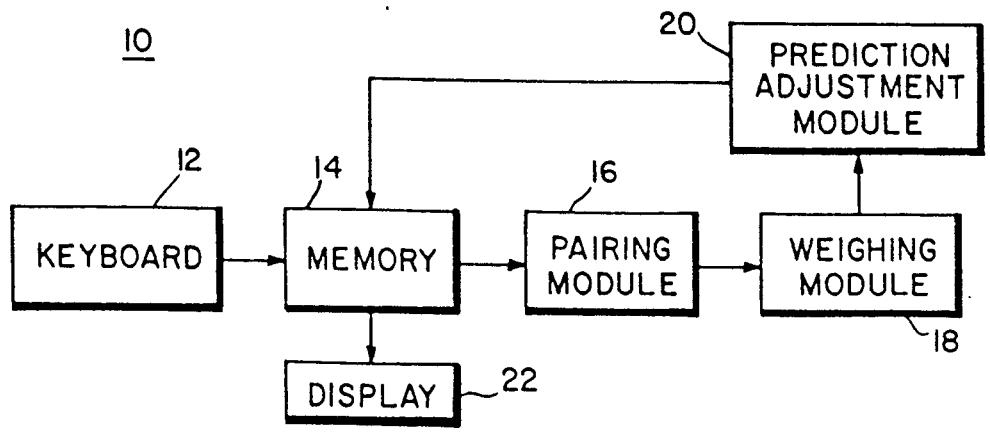
FIG. 1 is a schematic block diagram of a system according to this invention.

System 10 according to this invention, FIG. 1, includes keyboard 12 through which users of system 10 enter scalar ratings for items they have sampled such as movies. The ratings are stored in memory 14 and are selectively retrieved by pairing module 16 which, for each person for which a prediction is desired, pairs that person with a number of other persons who have previously entered scalar ratings.

A value for each pair representing the difference in ratings for items sampled by both members of each successive pair is provided to weighting module 18. For persons designated as predicting persons for the selected person, as described in more detail below, a weighting value is assigned based on the differences in ratings between that predicting person and the selected person. The weighting values are provided to prediction adjustment module 20 which applies the weighting values to items unsampled by the selected person to proportionally alter the difference between a rating previously predicted for the selected person for each unsampled item and the ratings of that item by the predicting persons. The rating predicted for each unsampled item represents the predicted reaction of the selected person to the up-to-now unsampled item. After adjustment, the ratings are provided to memory 14 which, when requested by a user, supplies to display 22 a list of usually the most highly recommended items for that user. Alternatively, another list based on the recommendations is provided such as a list of the most highly disrecommended items, or a list of one or more titles specified by the user. It is desirable for the latter list to include the rating predicted for each item to represent the predicted reaction of the user for those items.

In addition to implementation as an on site system, system 10 may receive input or provide output to a remote user. For example, keyboard 12 represents a device which receives input such as voice or digital signals provided over the telephone. The display 22 can provide voice or digital signals to a user to represent the recommended list.

Figure 2:
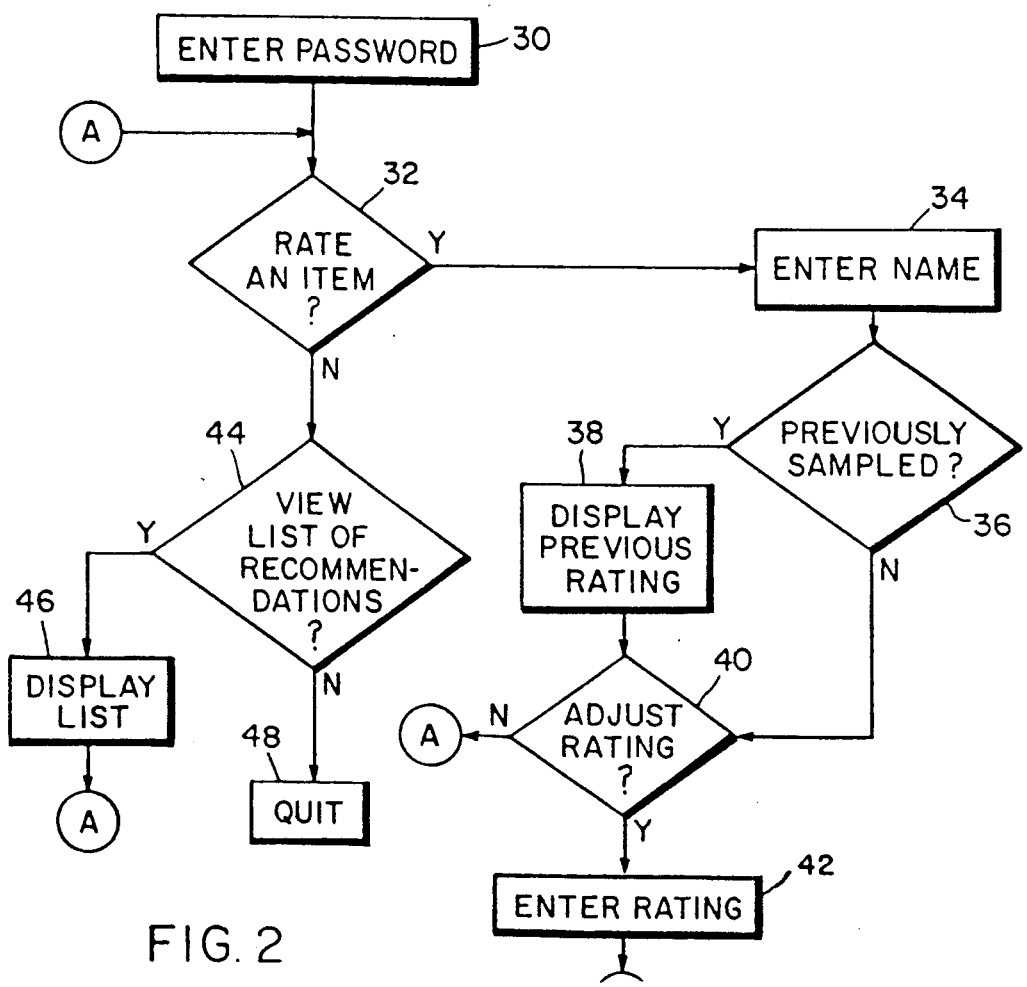
FIG. 2 is a flow chart of the use of the system of FIG. 1 by a user.

The interface between the user and system 10 is illustrated in FIG. 2. The user enters a password, step 30, and then decides to rate an item, such as a movie, step 32. To rate an item, the name of the item, such as the title of a movie, is entered into the system, step 34. If the item has been previously sampled, step 36, his previous actual rating of it is displayed, step 38. Regardless of whether the item has been actually rated, the user is allowed to adjust the rating, steps 40 and 42. Increasing the number of items actually sampled and rated increases the accuracy of reaction predictions made for items not yet sampled by that user as explained in greater detail below.

In one construction, the scalar ratings are integers ranging from 0 to 12, with "0" representing a reaction of "poor", "3" representing the reaction of "fair", "6" corresponding to a reaction of "good", "9" representing the reaction of "very good", and "12" corresponding to a reaction of "excellent". Establishing a greater number of ratings than the above listed five verbal descriptions provides more accurate rating of the reactions of the user.

After the rating is entered, or if adjustment is declined, the operation returns to step 32. If rating of an item is not selected, the user elects to view the most current list of recommendations, steps 44, 46, or exits the system, step 48.

Figure 3:
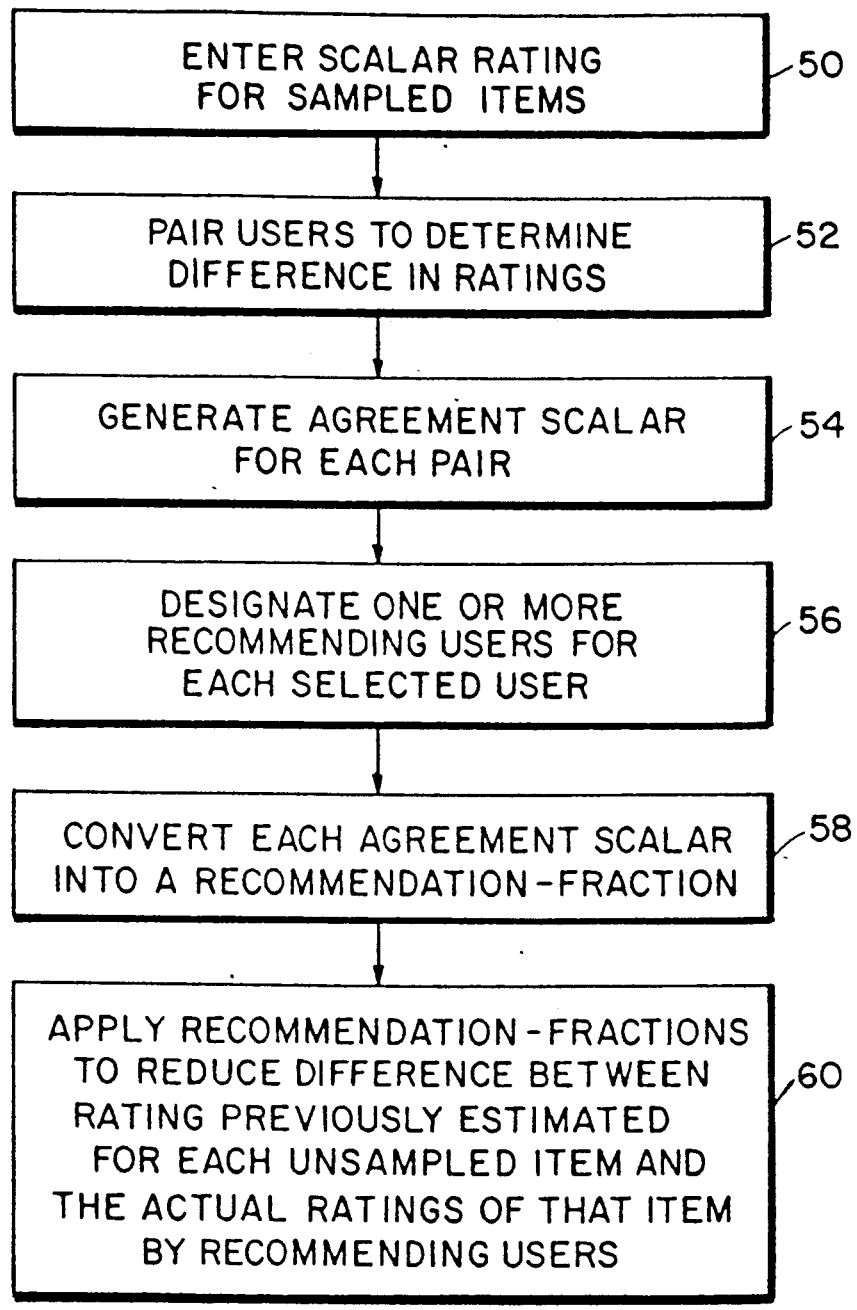
FIG. 3 is a flow chart of the operation of the system of FIG. 1 for each user selected to be updated.

The operation of system 10, FIG. 1, is summarized in FIG. 3. Each user enters a scalar rating for each item sampled by that user, step 50. Each user is successively paired, step 52, with a number of other users to determine the difference in ratings for items sampled by both users. For each pair of users, an agreement scalar is generated, step 54, to represent the overall rating difference between that pair of users. For each selected user, one or more of the other users are designated as recommending users, step 56, who contribute to ratings used to make recommendations for items yet to be sampled. The agreement scalar for each recommending user is then converted into a recommendation-fraction, step 58, which is then applied to reduce the difference between the rating previously estimated for each unsampled item and the actual ratings of that item by the recommending user, step 60. The recommendation fraction is typically a fraction ranging from zero to one.

Figure 4:
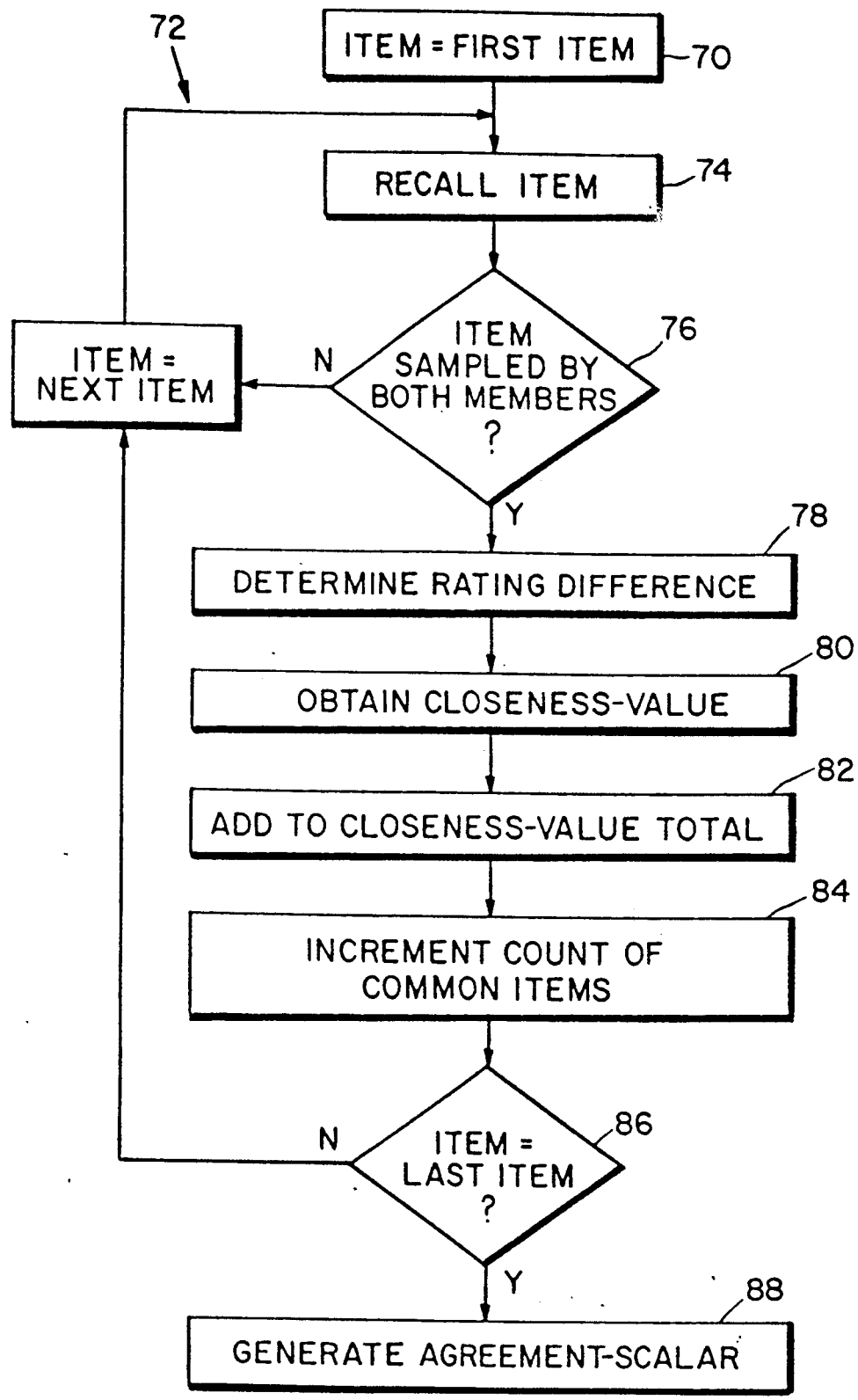
FIG. 4 is a more detailed flow chart of the pairing of users to determine the difference in ratings and to generate an agreement scalar.

The pairing of users to determine the difference in ratings and to generate an agreement scalar is shown in more detail in FIG. 4. For each pair of users, the item is set to first item, step 70, and loop 72 is entered until each of all possible items has been examined. The item is recalled, step 74, and the items for both members of the pair are matched to see if that item was sampled by both members, stp 76. A number of ratings for movies are provided as an example in Table I:

TABLE I: RATINGS

| Movie Title | Smith | Jones | Wesson |
| --- | --- | --- | --- |
| Star Wars | 8 | 11 | 10 |
| The Untouchables | 10 | 9 | 4 |
| Beverly Hills Cop | — | 10 | 10 |
| Fletch | 10 | — | 9 |
| Caddyshack | 7 | — | 11 |

The rating difference is determined, step 78, and a closeness value is obtained for that difference, step 80. In one construction, the closeness value is obtained from a look-up table such as Table II:

TABLE II

| Difference in Rating | Closeness Value |
| --- | --- |
| 0 | 10 |
| 1 | 9 |
| 2 | 6 |
| 3 | 4 |
| 4 | 2 |
| 5 | 1 |
| 6 | 0 |
| 7 | 0 |
| 8 | −1 |
| 9 | −6 |
| 10 | −8 |
| 11 | −10 |
| 12 | −10 |

Step 80 provides a weighting step in which large differences in ratings are penalized and similarities are rewarded. In other constructions, the unaltered differences themselves are used. In yhet other embodiments, ratios or item-specific probabilities of the differences may be compared, or agreement by types or categories of times may be utilized. Furthermore, for purposes of any comparison, a user's ratings may be first normalized to compensate for any extremism in ratings by that user.

In this embodiment, the closeness-value is added to a running total, step 82, and the count of items sampled by both members is incremented, step 84. After the last item has been processed, step 86, an agreement scalar is generated, step 88, for that pair of users. The agreement scalar may be generated by the use of the following equation:

$$AS = (CVT/n) \log_2 n \qquad (1)$$

where AS is the agreement scalar, CVT is the closeness-value total, and "n" is the count of items sampled by both users. By the example provided in Tables I and II, Smith and Jones have sampled two items in common having a difference in ratings of 3 and 1, respectively, which are assigned closeness values of 4 and 9, respectively. By application of equation (1), the agreement scalar for Smith and Jones is 6.5. Similarly, the closeness value for the pair of Smith and Wesson is k17 and the agreement scalar is 3.85. The difference in reaction of Smith and Wesson to "The Untouchables" and "Caddyshack" led to the smaller agreement scalar between those users. It is evident that the greater the number of items that the users have sampled, the more accurate the agreement scalar should be for each of the users with which the selected user is paired.

Figure 5:
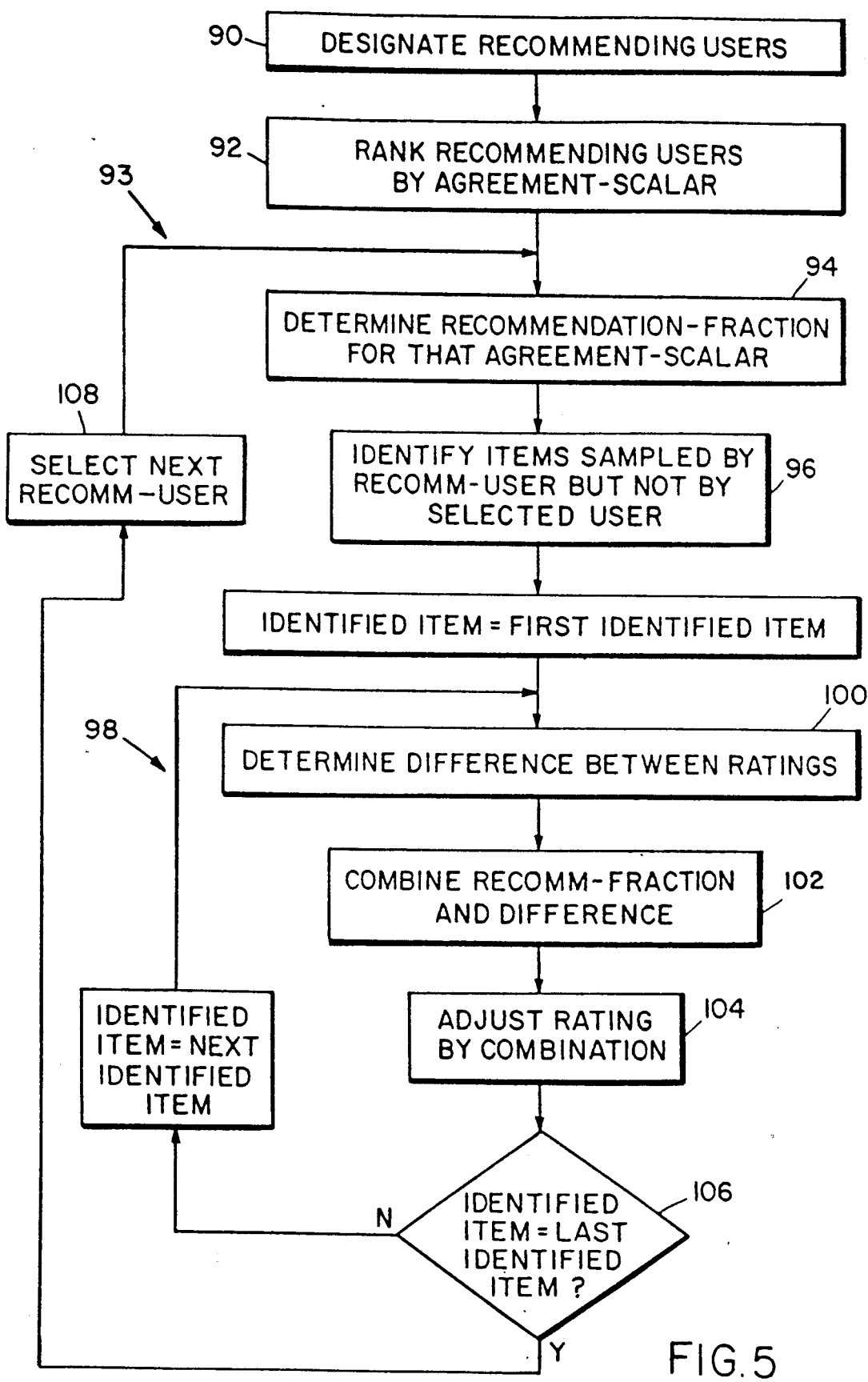
FIG. 5 is a flow chart of the conversion of the agreement scalar to a recommendation-fraction and subsequent adjustment of the previously established rating of the selected person.

The conversion of the agreement scalar to a weighting value, referred to as a recommendation-fraction, and adjustment of the previously established ratings is shown in FIG. 5. One or more recommending users are designated, step 90, from the group of users. If the number of users is small, the entire group may be used. Otherwise, a subset of the group, e.g., sixteen users may be used. Successive ones of the users are designated as selected users while the remainder of the subset are designated as recommending users.

The recommending users are ranked by order of agreement scalar, step 92. Each recommending user is then utilized to adjust the previously established, predicted ratings for the selected user, loop 93. A recommendation fraction is defined for the agreement scalar of the first recommending user, step 94. It is desirable to rank the recommending persons by ascending order of agreement scalar and in that order assigning to the ranked predicting persons progressively larger weighting values. For convenience, rank catagories may be employed, e.g. the top 16th of all users, the second 16th, and so on. In one embodiment, for agreement scalars in the fourth highest category a recommendation fraction of 1/16 is defined, for the third highest a recommendation fraction of ⅛ is defined, for the second highest a recommendation fraction of ¼ is defined, and for the highest category a recommendation fraction of ½ is defined. All other agreement scalars are assigned a value of zero for their recommendation-fraction. The lists of items for the recommending user and the selected user are matched to identify, step 96, items sampled by the recommending user but not by the selected user. Each identifying item is analyzed in loop 98 in which the difference between ratings is determined, the recommendation-fraction and the difference are combined, and the rating is adjusted by the combination, steps 100, 102, 104, respectively. When the recommendation-fraction has been combined with the difference for each item, including the last identified item, step 106, the next recommending user is selected, step 108.

In one embodiment, a difference between the ratings is determined by subtracting the previously estimated rating of the selected user from the actual rating of the recommending user. The difference is then multiplied by the recommendation-fraction to obtain an adjustment, and the adjustment is added to the previously estimated rating. When the recommending users are ranked in order of lowest to highest agreement scalar, the relative adjustment accorded by the recommending user with the highest scalar is enhanced. That is, because his effect is heavily weighted, it is not easily diluted by later adjustments from less appropriate recommending users.

While the terms "person" and "user" as used above refer to a human being, the terms are used in their broadest sense to refer to any entity which exhibits a subjective but not random reaction to an item. The above-described system and method of operation according to the present invention similarly apply to more than movies, record albums, computer games, television programs, or other consumer items. For example, reactions can be predicted for travel destinations, hotels, or restaurants. Further, predictions among categories can be accomplished, e.g., recommending books based on the ratings of movies. The system and method according to this invention are particularly useful for items which have significance in and of themselves to people, that is, predicting the reactions of people to the items benefits the people in optimally directing their investment of time and money in choosing and sampling items.

It is desirable for a recommendation system according to the invention to interact with an inventory management system, or to maintain an inventory status itself, when not all possible items are available. In a video store, for example, certain movies may not be carried by that store or, even if the items are stocked, those movies may have been checked out or otherwise made unavailable. In these circumstances it is desirable to check with the inventory management system as to the availability of a particular movie which is to be recommended.

Figure 6:
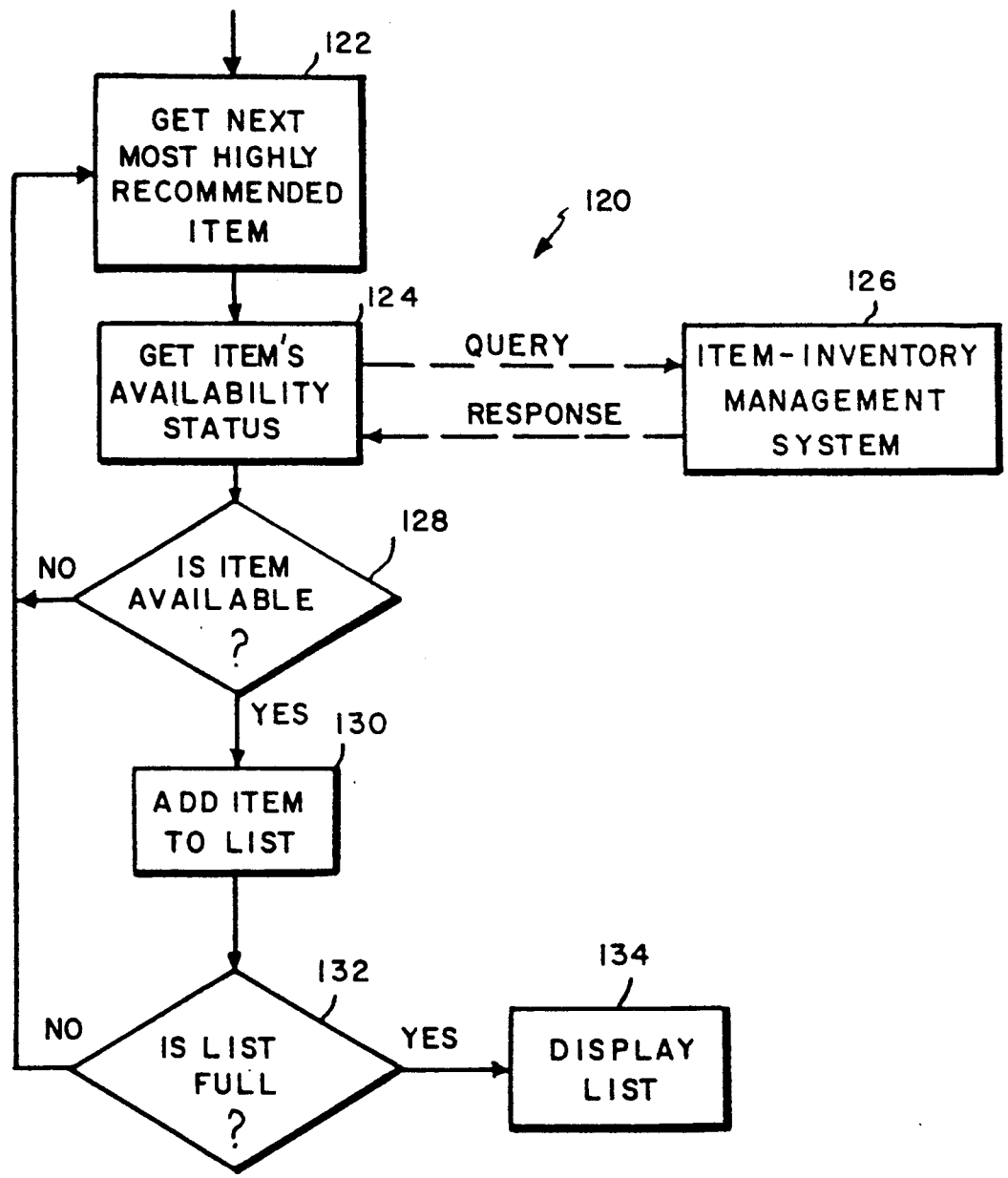
FIG. 6 is a flow chart of a portion of an alternative system according to the invention which interrogates an inventory management system before displaying recommendations.

Loop 20, FIG. 6 represents a modification of step 46 of FIG. 2. After the next most highly recommended item is determined and retrieved, step 122, from step 44, FIG. 2, the availability of that item is determined in step 124 by requesting the availability status of that item from item inventory management system 126. The availability of the item is then determined in step 128 by comparing the item with the inventory status for that item. If the item is not available, the operation returns to step 122 and that item is not recommended. If the item is available, that item is added to the list to be displayed, step 130. Loop 120 continues until the list is full as determined in step 132. The complete list of available items is then displayed, step 134.

While the inventory management system 126 is shown as a relatively distinct system, the recommendation system according to the invention and the inventory management system can be integrated into a single system. Two examples of separate inventory management systems which maintain an inventory status for each item carried by an item source such as a video store are VideoTrace available from Unique Business Systems, Santa Monica, Calif. and The Video Store, available from Olympic Business Systems, Inc., Federal Way, Wash.

Although specific features of the invention are shown in some drawings and not others, this is for convenience only as each feature may be combined with any or all of the other features in accordance with the invention.

Other embodiments will occur to those skilled in the art and are within the following claims:

What is claimed is:

1. A method of selectively recommending, for a user selected from a group of users, items sampled by one or more users in the group but not sampled by the selected user, the recommendations being based on other items previously sampled by that user and on the availability of the items from a source, the method comprising:

defining, for each item sampled by the selected user, a scalar rating representing the reaction of the selected user to that item;

successively pairing the selected user with other users in the group for whom have been defined scalar ratings for at least some of the items sampled by the selected user to determine the difference in ratings for items sampled by both members of that pair, and generating for each pair an agreement scalar representing the overall rating agreement between the members of each successive pair;

designating a plurality of the other users as recommending users and converting, for each of the recommending users, the agreement scalar into a weighting value;

applying the weighting values to items not yet sampled by the selected user to proportionally alter the difference between a rating previously established for each item not yet sampled by the selected user and the ratings of that item by the recommending users to adjust the recommendations for the selected user to more closely anticipate the actual reaction of the user to that item; and selecting at least one item to be presented to the selected user based on a predetermined criterion and on the availability of the item from the source.

2. The method of claim 1 in which pairing includes successively matching, for each pair, items sampled by both members and, for each matched item, comparing the ratings of one member from the rating of the other member to obtain the difference in ratings.

3. The method of claim 2 in which pairing further includes converting, for each pair, the difference in ratings for each matched item to a closeness value, and combining the closeness values for the members of that pair.

4. The method of claim 3 in which pairing further includes weighting, for each pair, the combined closeness values by the number of items sampled by both members to generate the agreement scalar.

5. The method of claim 3 in which designating and converting includes defining a greater weighting value for recommending users having a larger agreement scalar and defining a lesser weighting value for recommending users having a smaller agreement scalar.

6. The method of claim 3 in which designating and converting includes ranking the recommending users by ascending order of agreement scalar and in that order assigning to the ranked recommending users progressively larger weighting values.

7. The method of claim 1 in which the predetermined criterion is selection of at least the most highly recommended item for the selected user.

8. The method of claim 1 in which the predetermined criterion is specified by the user prior to the recommendation.

9. The method of claim 1 in which applying includes combining the weighting value for each recommending user with the difference between the actual rating by that recommending user and the previously recommended rating by the selected user for each unsampled item, and summing the combination with the previously recommended rating.

10. The method of claim 1 in which pairing includes successively pairing the selected user with each other user in the group.

11. The method of claim 1 in which pairing includes defining a subset of other users in the group to be successively paired with the selected user.

12. The method of claim 1 in which selecting includes determining the availability of the item by interrogating a system which maintains an inventory of items at the source.

13. The method of claim 1 further including maintaining an inventory status of the items at the source, and selecting includes determining the availability of the item by comparing the item with the inventory status for that item.

14. The method of claim 1 further including successively selecting the remainder of the users in the group to adjust the recommendations for each user in the group.

15. The method of claim 1 further including presenting the selected item to the selected user.

16. A method of selectively recommending, for each user successively selected from a group of users, items sampled by one or more users in the group but not sampled by the selected user, the recommendations being based on other items previously sampled by that user and on the availability of the items from a source, the recommendations being represented by a scalar rating for each item, the method comprising:
  defining, for each item sampled by the selected user, a scalar rating representing the reaction of the selected user to that item;
  successively pairing the selected user with other users in the group for whom have been designated scalar ratings for at least some of the items sampled by the selected user to determine the difference in rating for items sampled by both members of each successive pair;
  generating for each pair an agreement scalar representing the overall rating agreement between the members of that pair;
  designating at least one of the other users as recommending users;
  converting, for each of the recommending users, the associated agreement scalar into a recommendation fraction;
  identifying items unsampled by the selected user;
  applying the recommendation fractions to proportionally decrease the difference between a rating previously established for each identified item for the selected user and the actual ratings of that item by the recommending users to adjust the recommendations for the selected user;
  selecting at least one item to be presented to the selected user based on a predetermined criterion and on the availability of the item from the source;
  successively selecting the remainder of the users in the group to adjust the recommendations for each user in the group; and
  presenting, for each user, a plurality of items selected for that user.

17. The method of claim 16 in which pairing includes successively matching, for each pair, items sampled by both members and, for each matched item, comparing the rating of one member with the rating of the other member to obtain the difference in ratings.

18. The method of claim 17 in which pairing further includes converting, for each pair, the difference in ratings for each matched item to a closeness value, and combining the closeness values for the members of that pair.

19. The method of claim 18 in which pairing further includes weighting, for each pair, the combined closeness values by the number of items sampled by both members to generate the agreement scalar.

20. The method of claim 19 in which designating and converting includes sorting the recommending users by ascending order of agreement scalar and in that order assigning to the ranked predicting users progressively larger weighting values.

21. The method of claim 20 in which applying includes combining the weighting fraction for each recommending user with the difference between the actual rating by that recommending user and the previous predicted rating by the selected user for each identified item, and summing the combination with the previously established rating.

22. The method of claim 21 further including initially setting the established rating for each unsampled item for each selected user to a low rating value.

23. The method of claim 16 in which selecting includes determining the availability of the item by interrogating a system which maintains an inventory of items at the source.

24. The method of claim 16 further including maintaining an inventory status of the items at the source, and selecting includes determining the availability of the item by comparing the item with the inventory status for that item.

25. A system for selectively recommending, for a user selected from a group of users, items sampled by one or more users in the group but not sampled by the selected user, the recommendations being based on other items previously sampled by that user and on the availability of the items from a source, the system comprising:
  means for defining, for each item sampled by the selected user, a scalar rating representing the reaction of the selected user to that item, said means for defining including input means for entering information representing the reaction of the selected user to items sampled by that user;
  means for successively pairing the selected user with other users in the group for whom have been defined scalar ratings for at least some of the items sampled by the selected user to determine the difference in ratings for items sampled by both members of each successive pair;
  means for designating a plurality of the other users as recommending users and assigning a weighting value to each of the recommending users based on the overall difference in ratings between that predicting user and the selected user;
  means for applying the weighting values to items not yet sampled by the selected user to proportionally alter the difference between a rating previously established for each item not yet sampled by the selected user and the ratings of that item by the recommending users to adjust the recommendations for the selected user to more closely anticipate the actual reaction of the user to that item; and
  means for selecting at least One item to be presented to the selected user based on a predetermined criterion and on the availability of the item from the source.

26. A computing device for selectively recommending, for a user selected from a group of users, items sampled by one or more users in the group but not sampled by the selected user, the recommendations being based on other items previously sampled by that user and on the availability of the items from a source, the system comprising:

means for defining, for each item sampled by the selected user, a scalar rating representing the reaction of the selected user to that item, said means for defining including input means for entering information representing the reaction of the selected user to items sampled by that user;

means for successively pairing the selected user with other users in the group for whom have been defined scalar ratings for at least some of the items sampled by the selected user to determine the difference in rating for items sampled by both members of each successive pair, said means for pairing including means for generating for each pair an agreement scalar representing the overall rating difference between the members of that pair;

means for designating a plurality of the other users as recommending users and for converting, for each of the recommending users, the agreement scalar into a weighting fraction;

means for establishing an initial scalar rating for each identified item for the selected user;

means for identifying items not yet sampled by the selected user and applying the weighting values to items not yet sampled by the selected user to proportionally alter the difference between one of the initial scalar rating for each identified item and a rating previously predicted for each identified item and the ratings of that item by the predicting users to adjust the recommendations for the selected user to more closely anticipate the actual reaction of the user to that item; and means for selecting at least one item to be presented to the selected user based on a predetermined criterion and on the availability of the item from the source.

27. A method of selectively recommending, for a viewer selected from a group of viewers, movies sampled by one or more viewers in the group but not sampled by the selected viewer, the recommendations being based on other movies previously sampled by that viewer, the method comprising:

defining, for each movie sampled by the selected viewer, a scalar rating representing the reaction of the selected viewer to that movie;

successively pairing the selected viewer with other viewers in the group for whom have been defined scalar ratings for at least some of the movies sampled by the selected viewer to determine the difference in ratings for movies sampled by both members of that pair, and generating for each pair an agreement scalar representing the overall rating agreement between the members of each successive pair;

designating a plurality of the other viewers as recommending viewers and converting, for each of the recommending viewers, the agreement scalar into a weighting value; and applying the weighting values to movies not yet unsampled by the selected viewer to proportionally alter the difference between a rating previously established for each movie not yet sampled by the selected viewer and the ratings of that movie by the recommending viewers to adjust the recommendations for the selected viewer to more closely anticipate the actual reaction of the viewer to that movie.

28. A computing device for selectively recommending, for a viewer selected from a group of viewers, movies sampled by one or more viewers in the group but not sampled by the selected viewer, the recommendations being based on other movies previously sampled by that viewer and on the availability of the items from a source, the system comprising:

means for defining, for each movie sampled by the selected viewer, a scalar rating representing the reaction of the selected viewer to that movie, said means for defining including input means for entering information representing the reaction of the selected viewer to movies sampled by that viewer;

means for successively pairing the selected viewer with other viewers in the group for whom have been defined scalar ratings for at least some of the movies sampled by the selected viewer to determine the difference in rating for movies sampled by both members of each successive pair, said means for pairing including means for generating for each pair an agreement scalar representing the overall rating difference between the members of that pair;

means for designating a plurality of the other viewers as recommending viewers and for converting, for each of the recommending viewers, the agreement scalar into a weighting fraction;

means for establishing an initial scalar rating for each identified movie for the selected viewer; and means for identifying movies not yet sampled by the selected viewer and for applying the weighting values to movies not yet sampled by the selected viewer to proportionally alter the difference between one of the initial scalar rating for each identified movie and a rating previously predicted for each identified movie and the ratings of that movie by the predicting viewers to adjust the recommendations for the selected viewer to more closely anticipate the actual reaction of the viewer to that movie.

* * * * *